Oct. 9, 1951 A. COTSWORTH, III 2,570,209
TELEVISION PROGRAM METERING SYSTEM
Filed May 1, 1948
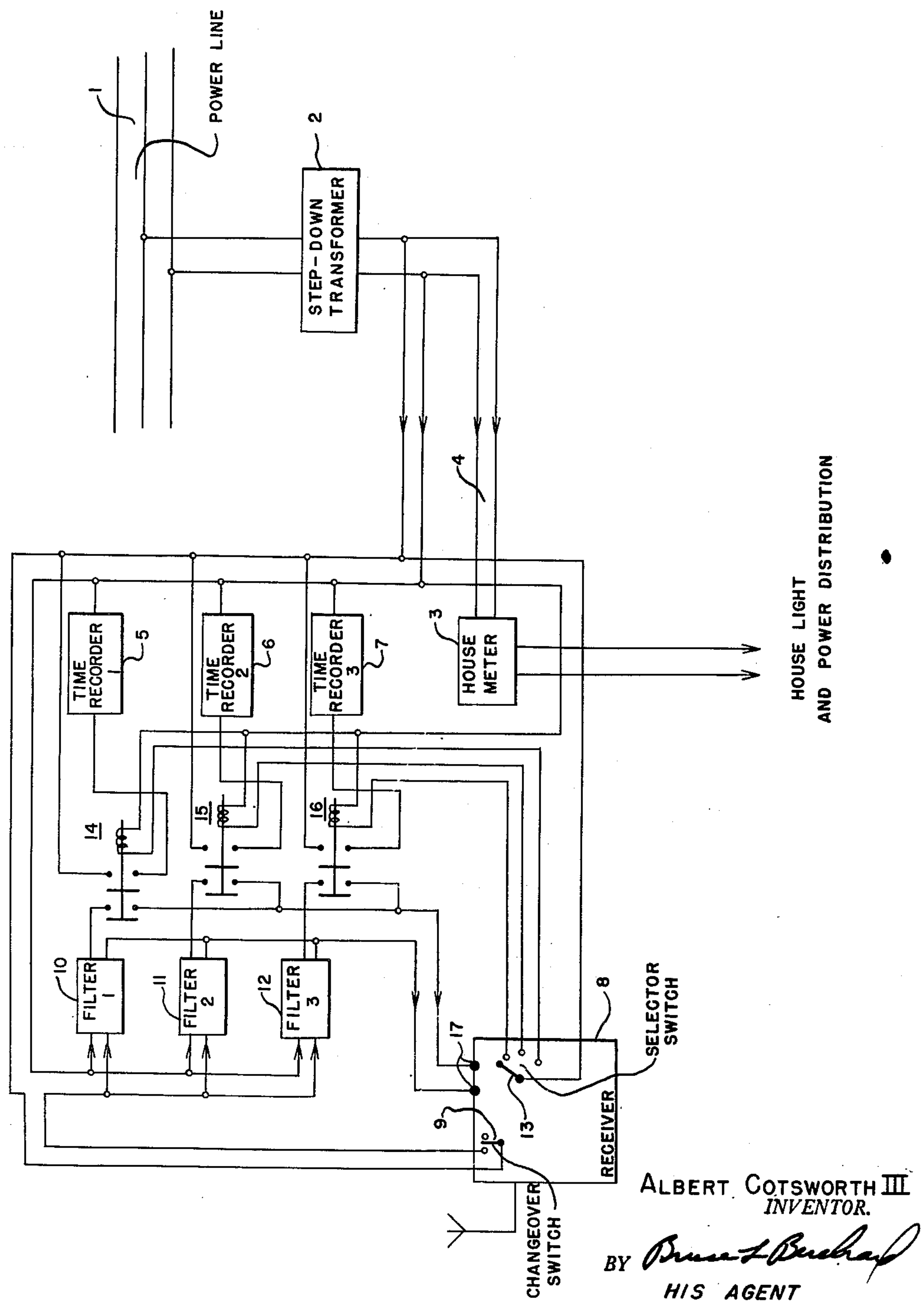
ALBERT COTSWORTH III
INVENTOR.
BY Bruce L. Birchard
HIS AGENT Patented Oct. 9, 1951 2,570,209

UNITED STATES PATENT OFFICE 2,570,209

TELEVISION PROGRAM METERING SYSTEM

Albert Cotsworth, III, Oak Park, Ill., assignor to Zenith Radio Corporation, a corporation of Illinois Application May 1, 1948, Serial No. 24,498

2 Claims. (Cl. 178—5.6)

This invention relates to radio systems of the subscriber type, and more particularly to such systems in which a coded radio signal is radiated by radio broadcast, and a key signal is transmitted by wire line conductor to subscriber receiving systems, the combination of the key signal with the radiated coded signal being necessary at the receiving systems for proper reproduction of the coded radiated signal.

Such systems are disclosed and broadly claimed in application No. 742,374, Alexander Ellett, et al., filed April 18, 1947, which has now issued to Patent 2,510,046, May 30, 1950, and assigned to the asignee of the present application.

In the above mentioned copending application a system is disclosed for the transmission to subscribers of a complete signal, part by radio broadcast and part by wire line conductor, which complete signal is utilized in the subscriber receiver to reproduce properly the coded signal. As stated, the wire line conductors may conveniently be telephone lines, power lines or the like, some arrangement being provided in connection with the wire line conductors for keeping a record of the time when such signals are utilized by the subscriber so that he may be charged therefor. The present invention is directed to such systems, particularly television systems, in which conventional power lines are used to distribute the necessary completting or key signal to subscriber receiving systems.

It is an object of this invention to provide a subscriber receiving system, which includes an arrangement for selecting an appropriate key signal from the power lines for combination with a received coded signal for proper reproduction of the coded signal, and which further includes an arrangement for simultaneously initiating a time recording meter so that a charge may be made for the time of utilization of the selected key signal.

The features of this invention, which are believed to be new, are set forth with particularity in the appended claims. The invention itself, however, together with further objects and advantages thereof, may best be understood by reference to the following description when taken in conjunction with the accompanying drawing, in which the single figure shows a preferred arrangement of the proposed receiving system.

It is contemplated in the present invention that a plurality of key signals, each corresponding to a particular radiated coded signal, be superimposed upon a conventional power line at differing frequencies for distribution to subscriber receiving systems, so that these signals do not interfere with each other or with the normal power carried by these lines.

Referring now to the figure, a conventional power line designated 1 is shown therein, this power line carrying usual electrical power for distribution to consumers, and further carrying a plurality of key signals of different frequencies superimposed thereon, these key signals being associated respectively with radiated coded signals.

A step-down transformer 2 is utilized to reduce the potential of the power line 1 to the normal household value, and power at this reduced potential is distributed to the household through meter 3. Meter 3 is of the usual watt-hour type and is coupled to transformer 2 by way of leads 4. Time recording meters 5—7 are placed adjacent the meter 3, these recording meters maintaining a record of the time of utilization of the various key signals carried by power line 1. The number of recorders corresponds to the number of key signals so carried, three being shown for purposes of simplicity. Recorders 5—7 may be read together with meter 3 periodically by the power company representative, and appropriate charges made to the subscriber based on the readings of these recorders.

The receiver proper is indicated by block diagram 8, and this receiver may be one of the types disclosed in the aforementioned application Serial No. 742,374. Receiver 8 may be operated for the reception of conventional signals, and in addition for the reception and reproduction of the above mentioned coded signals and associated key signals.

When it is desired to reproduce a coded signal in receiver 8, switch 9 is closed completing the circuit between filters 10, 11 and 12, and step-down transformer 2. The key signals carried by power line 1 are separated in filters 10—12 and may be individually derived from the respective outputs of these filters. It is apparent that the number of such filters corresponds to the number of key signals carried by the power line 1.

A selector switch 13 is used to select respective key signals from filters 10—12, and this switch is mounted on the panel of receiver 8. Switch 13 may be coupled to the tuning circuit of the receiver so that when the receiver is tuned to a coded signal, the key signal corresponding to this coded signal is simultaneously selected from filters 10—12. The contacts of switch 13 are connected respectively to relays 14, 15 and 16, and when the moving arm of switch 13 connects with one of these contacts it closes the energizing circuit of the corresponding relay. For example, when switch 13 is turned to the lowermost contact, relay 14 is energized and closes the output circuit of filter 10, applying the key signal derived from this filter to receiver 8 by way of terminals 17. Relay 14 simultaneously closes the energizing circuit of time recorder 5, and a record is kept of the time of utilization of the key signal from filter 10. Similarly, operation of relays 15 and 16 by selector switch 13 causes key signals from filters 11 and 12 respectively to be applied to terminals 17, and simultaneously causes respective recorders 6 and 7 to be energized.

Switch 9 may be coupled to selector switch 13 so that when the receiver is again conditioned for normal operation by manipulation of switch 9, switch 13 is placed in an open position, and the time recorders 5—7 are thereby de-energized.

This invention therefore provides a receiving system for coded signals that is simple and economical to construct, and in which the subscriber himself makes all the necessary adjustments, outside agencies being called upon merely to read the time recorder meters and to determine the necessary charges for the use of the respective key signals by the subscriber.

Relays 14—16 and meters 5—7 are appropriately sealed to prevent tampering by unauthorized persons. If so desired, relays 14—16 may be placed in an inaccessible place such as adjacent the step down transformer 2 on the power line pole similarly to prevent tampering.

Although selector switch 13 is shown coupled to control relays 14—16 by separate direct conductors, it is obvious that this control may be effected in any known manner by means of pulses, tone signals and the like. For example, selector switch 13 may take the form of a conventional telephone dial connected in the usual manner to control relays 14—16.

Therefore, while a certain specific embodiment of the invention has been shown and described, it is obvious that modifications may be made without departing therefrom. The appended claims are, therefore, intended to cover any such modifications as fall within the true spirit and scope of the invention.

I claim:

1. A television system tunable to any selected one of a plurality of channels including a subscription channel over which a television signal is received in coded form, and connectable to a power line which transmits a decoding signal for said television signal having a discretely different frequency from that of a power signal concurrently transmitted over said line, said system comprising: a tunable receiver for utilizing signals received over any of said channels; a filter network coupled to said power line for separating said decoding signal from said power signal; a time recorder for recording the time of use of said decoding signal by said system; and a switch actuated concurrently with the tuning of said receiver to connect said filter to said receiver and to energize said recorder during operating intervals when said receiver is tuned to said subscription channel.

2. A television system tunable to any selected one of a plurality of channels including a subscription channel over which a television signal is received in coded form, and connectable to a power line which transmits a decoding signal for said television signal having a discretely different frequency from that of a power signal concurrently transmitted over said line, said system comprising: a tunable receiver for utilizing signals received over any of said channels; a filter network coupled to said power line for separating said decoding signal from said power signal; a time recorder for recording the time of use of said decoding signal by said system; a switch actuated concurrently with the tuning of said receiver to connect said filter to said receiver and to energize said recorder during operating intervals when said receiver is tuned to said subscription channel; and a second switch for disconnecting said filter from said power line and mechanically coupled to said first switch for concurrently deenergizing said recorder.

ALBERT COTSWORTH, III.

REFERENCES CITED

The following references are of record in the file of this patent:

UNITED STATES PATENTS

| Number | Name | Date |
|---|---|---|
| 1,577,106 | Clement | Mar. 16, 1926 |
| 1,622,135 | Duncan | Mar. 22, 1927 |
| 1,688,452 | Demarest | Oct. 23, 1928 |
| 1,688,453 | Demarest | Oct. 23, 1928 |
| 1,754,877 | Clement | Apr. 15, 1930 |
| 1,925,909 | Rossberg | Sept. 5, 1933 |
| 2,094,060 | Busch | Sept. 28, 1937 |
| 2,095,360 | Green | Oct. 12, 1937 |
| 2,135,577 | Herbst | Nov. 8, 1938 |
| 2,153,319 | Topfer | Apr. 4, 1939 |
| 2,208,922 | Butler | July 23, 1940 |
| 2,218,571 | Beale | Oct. 22, 1940 |
| 2,397,079 | Babbock | Mar. 26, 1946 |

FOREIGN PATENTS

| Number | Country | Date |
|---|---|---|
| 386,849 | Great Britain | Jan. 25, 1935 |